United States Patent Office 2,892,535
Patented June 30, 1959

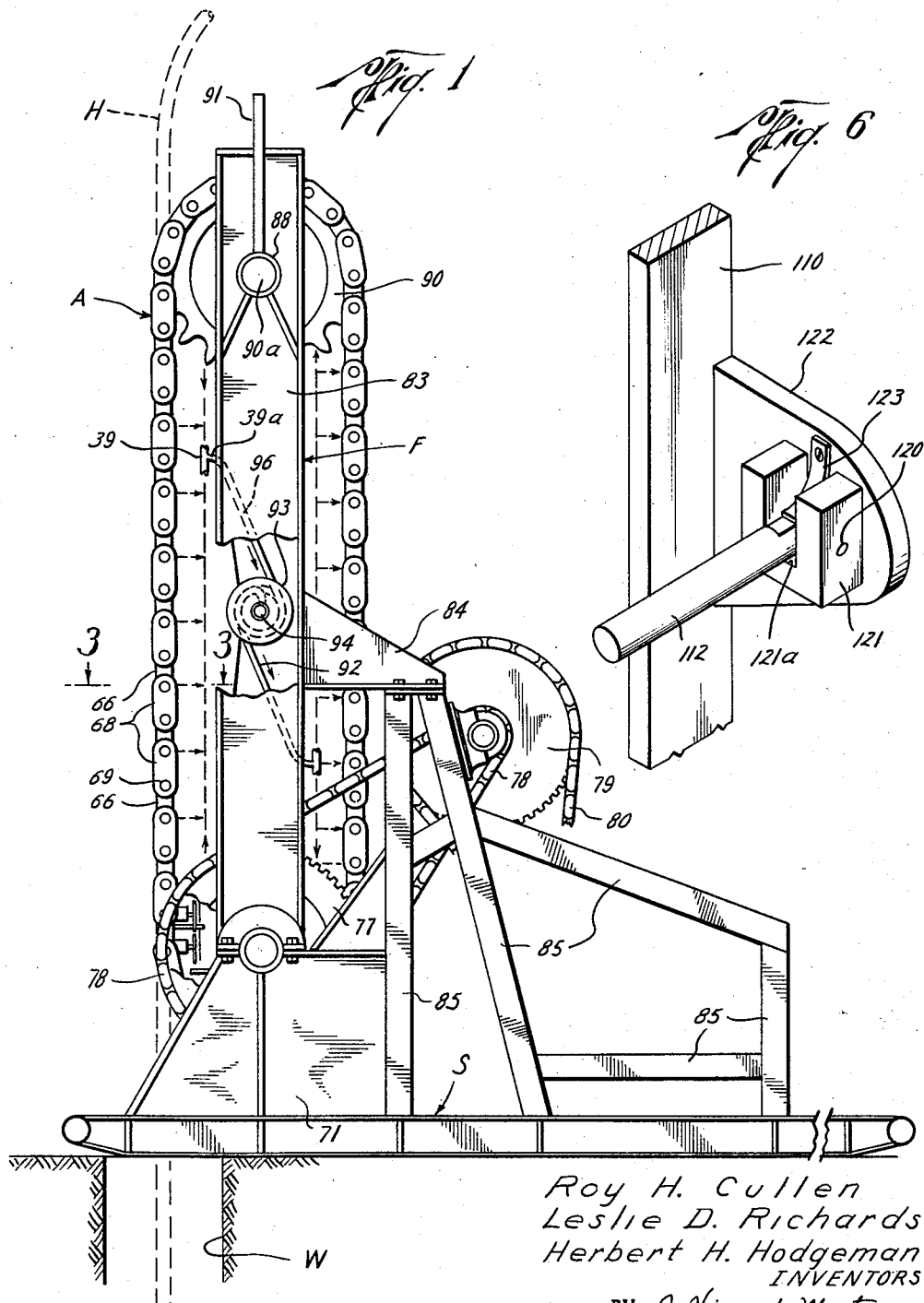

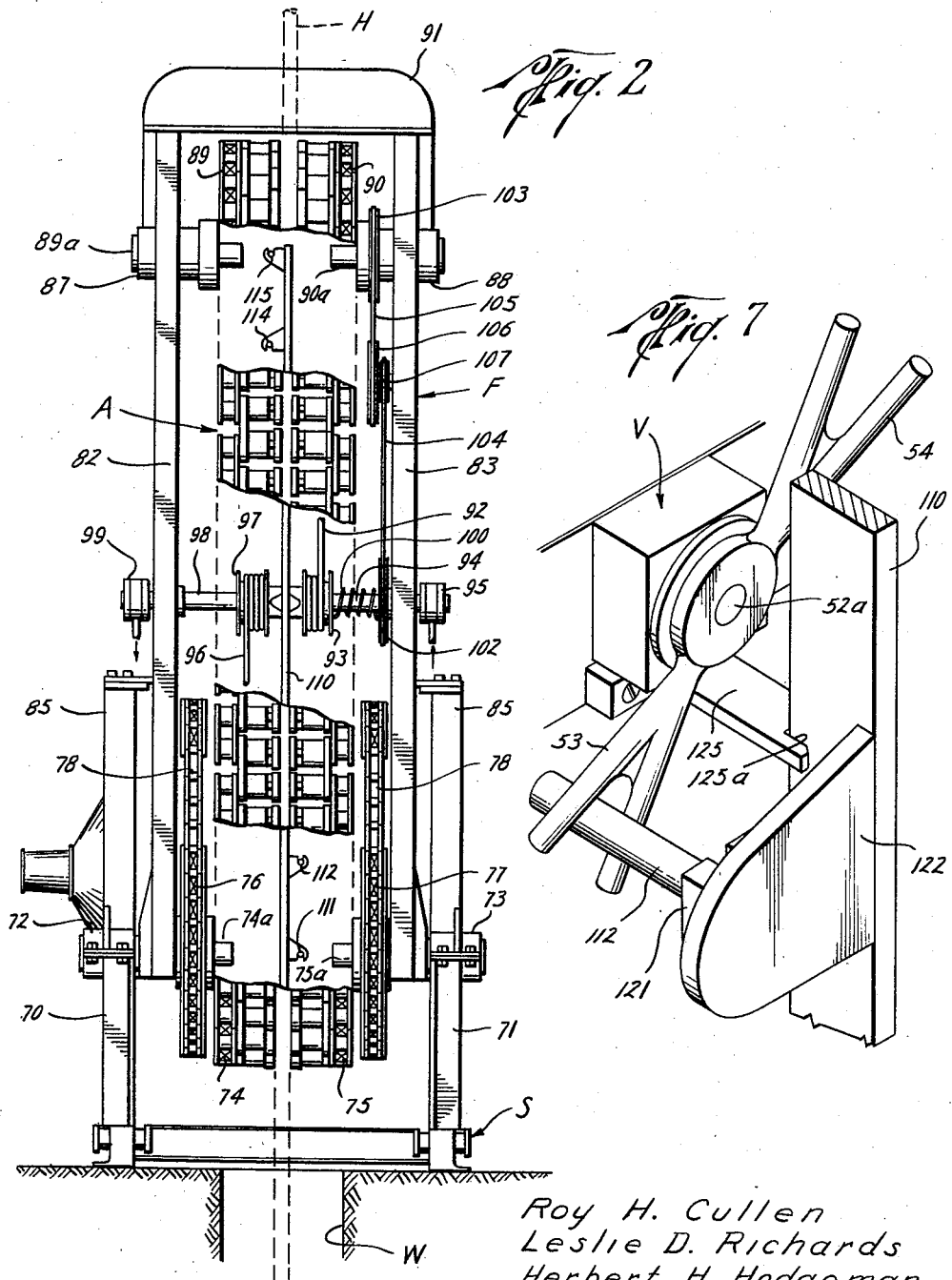

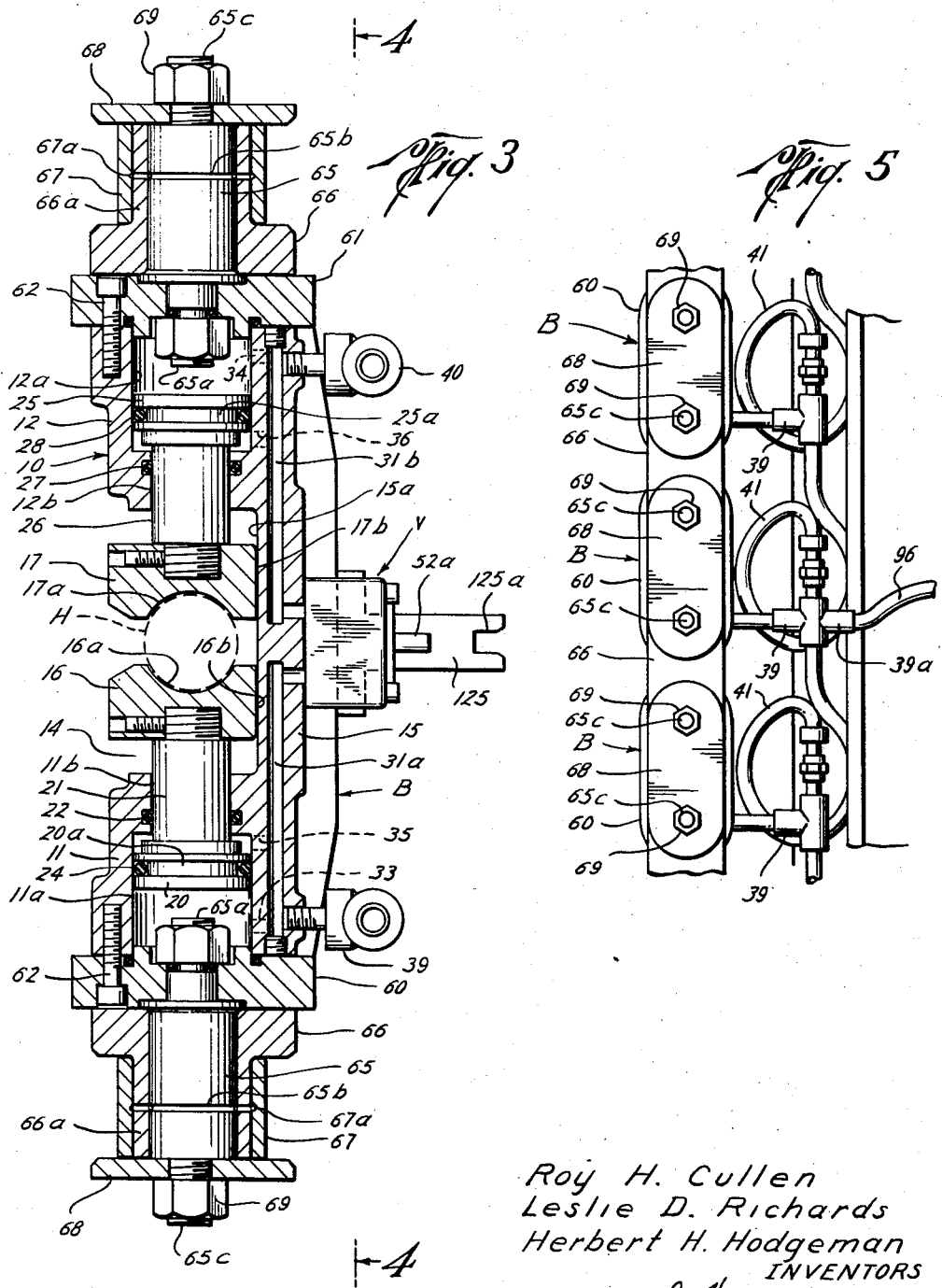

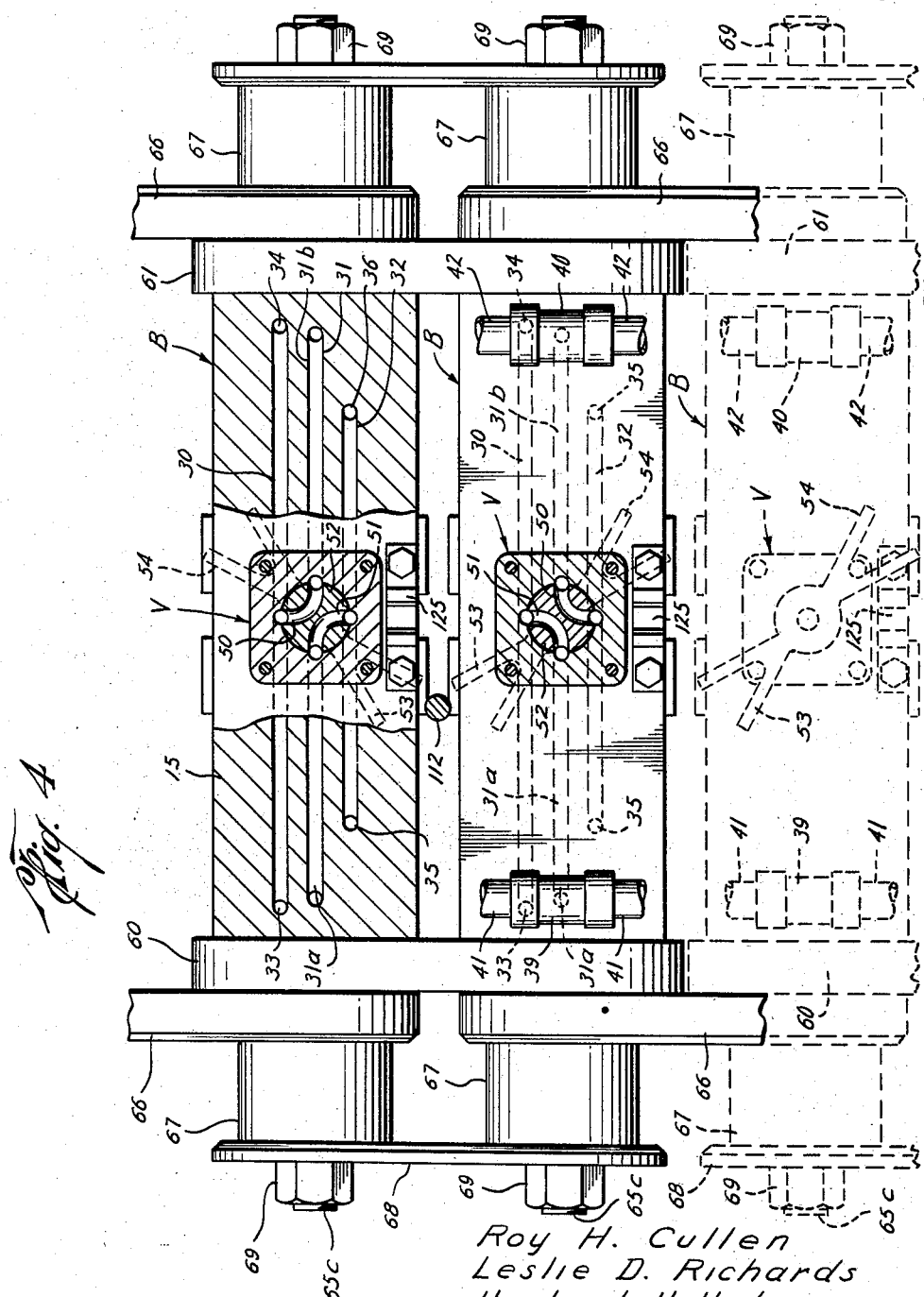

2,892,535

APPARATUS FOR HANDLING HOSE OR SIMILAR ELONGATE MEMBERS

Roy H. Cullen, Leslie D. Richards, and Herbert H. Hodgeman, Houston, Tex.; said Richards and Hodgeman assignors to said Cullen Application November 3, 1955, Serial No. 544,714

20 Claims. (Cl. 203—305)

This invention relates to new and useful improvements in apparatus for handling hose or similar elongate members.

An object of this invention is to provide a new and improved apparatus for handling hose or similar elongate members, and particularly for lowering and raising flexible supports or hoses into and out of a well.

An important object of this invention is to provide a new and improved clamping or gripping mechanism for frictionally engaging a hose or the like with a predetermined force which is adequate to prevent the release of the hose therefrom during movement thereof but which is insufficient to crush the hose during such movement.

Another object of this invention is to provide a new and improved apparatus for hoisting or lowering a hose or other elongate members from a well bore or similar location without any material bending of the hose while the weight thereof is supported by said apparatus.

Another object of this invention is to provide a new and improved apparatus for applying traction to a hose or similar elongate member with a predetermined hydraulic or fluid pressure force to automatically and continuously feed the hose or similar elongate member in a substantially straight path.

A further object of this invention is to provide a new and improved apparatus for applying traction to a hose or the like wherein the axes of the means gripping the hose are aligned with the axes of supporting spindles therewith and such aligned axes are perpendicular to the path of the hose being handled by the apparatus, whereby tilting or angular displacement of the gripping means is prevented while applying traction to the hose.

A still further object of this invention is to provide a new and improved apparatus for handling hose or the like, wherein the apparatus is constructed in the form of an endless chain with means provided therewith for automatically gripping and releasing the hose to feed the hose in a substantially straight path, whereby the hose is fed continuously so long as the endless chain operates and without causing any destructive bending of the hose.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is an elevation, partly in schematic form, illustrating the apparatus of this invention in position over a well bore or hole.

Figure 2 is a side view of the apparatus shown in Figure 1.

Figure 3 is a sectional view illustrating in detail one of the clamping devices or mechanisms in the apparatus of Figures 1 and 2.

Figure 4 is an elevation taken on line 4—4 of Figure 3 and illustrating a plurality of the clamping devices or mechanisms of Figure 3 connected together in a manner to form an endless chain, as shown in Figure 1.

Figure 5 is an elevation illustrating a portion of the endless chain of Figure 1 and also including the details of one form of hose connection for the hydraulic system used in operating the clamping devices of the apparatus.

Figure 6 is an isometric view illustrating in detail one of the valve-actuating members of the apparatus.

Figure 7 is an isometric view illustrating the coaction between one of the clamping device valves and one of the valve-actuating members.

In the drawings, the letter A designates generally the apparatus of this invention for handling a hose H or similar elongate member (Figures 1 and 2). The apparatus A is composed of a plurality of clamping or gripping devices or mechanisms B (Figures 3 and 4) which are connected together to form an endless chain, whereby the clamping devices are adapted to lower or hoist the hose H or a similar elongate member into and out of the well bore W or other similar location, as will be explained.

The details of the clamping devices or mechanisms B are shown in Figures 3–5, and particularly in Figure 3, wherein the numeral 10 designates the body of a clamping device B. Such body 10 is formed with piston chamber sections 11 and 12 which have chambers 11a and 12a therein, respectively. The sections 11 and 12 are spaced from each other so as to leave the longitudinal space 14 therebetween, and a side section 15 of the body 10 connects the piston chamber sections 11 and 12 together so as to form a U-shaped body 10.

A pair of gripping or clamping members 16 and 17 are disposed in the space 14 between the piston chamber sections 11 and 12 and are adapted to move towards each other to grip the hose H or other elongate member and are adapted to move away from each other in order to release the hose or other member H. The surfaces 16a and 17a which contact the external surface of the hose H are preferably substantially semicircular in shape so as to apply a uniform compression on the hose H which is ordinarily circular in cross section. The surfaces 16a and 17a are preferably smooth so as to prevent the leaving of permanent impressions or marks on the hose H or other elongate member being handled with the device.

A piston 20 is disposed in the piston chamber 11a and it has a piston rod 21 connected therewith and with the gripping member 16, so that movement of the piston 20 imparts corresponding movement to the gripping member 16. The piston rod 21 moves through an opening 11b in the piston chamber section 11 which is sealed by an annular seal ring 22 which is formed of rubber or any other similar sealing material. The piston 20 may be of any number of constructions, but as shown it includes an annular seal ring 24 which is positioned in an annular groove 20a so that such ring 24 is in constant sealing engagement with the inner surface of the piston chamber 11a. When fluid is admitted to either side of the piston 20, the piston is caused to move, as will be explained hereinafter.

The gripping or clamping member 17 is similarly connected to a piston rod 26 which has connection with a piston 25 disposed in the chamber 12a of the body section 12. An annular seal ring 27 seals between the piston rod 26 and the opening 12b through which such rod extends. Also, the piston 25 is similar to the piston 20 in that it employs a seal ring 28 of rubber or a similar sealing material which is fitted into an annular groove 25a for constant sealing engagement with the wall of the chamber 12a. The movements of the piston 25 are, of course, controlled by the introduction of fluid pressure to either side thereof, as will be explained, so that corresponding movement is imparted to the member 17.

During the movement of the gripping members 16 and 17 towards and away from each other, their inner surfaces 16b and 17b are in engagement with the laterally-extending surface 15a of the side body section 15 to assist in maintaining the members 16 and 17 aligned with each other during their movement.

For supplying fluid pressure, preferably hydraulic pressure, to the piston chambers 11a and 12a, the body 10 has a plurality of longitudinal fluid passages 30, 31, and 32 (Figure 4) formed in the side body section 15. The central passage 31 is actually divided into half sections 31a and 31b (Figure 3). The longitudinal passage 30 has laterally-extending openings 33 and 34 which establish fluid communication between the passage 30 and the areas behind the pistons 20 and 25, respectively. The longitudinal passage 32 has laterally-extending openings 35 and 36 for establishing communication from the passage 32 to the areas in front of the pistons 20 and 25, respectively. Hydraulic pressure, or any other fluid pressure, is constantly supplied to the portion 31b of the central longitudinal passage 31 through a hose fitting 40. The portion 31a of the central longitudinal passage 31 is constantly open to exhaust through hose fitting 39. As best seen in Figure 5, the hose fitting 39 of each clamping device B is connected to the adjacent hose fitting 39 of the adjacent clamping device B with a section of hose or fluid conductor 41 which is looped whereby an exhaust system for the endless chain formed by the connected clamping devices B is provided. The fittings 40 for the clamping devices B are similarly connected with hoses or flexible fluid conductors 42 (partially shown in Figure 4) which are looped in the same manner as the hoses 41 shown in Figure 5, whereby a pressure system is provided on the other side of the clamping devices B. Each of the hose fittings 39 and 40 would have associated therewith a check valve and a choke so as to prevent pulsations in the fluid passing therethrough and to permit a pressure build-up in the systems. It should also be pointed out that in some cases it may be preferable to connect every other fitting 39 with the same hose so as to actually provide two duplicate exhaust systems with the alternate devices B connected in different systems. Likewise, for the pressure system, the fittings 40 can be connected with every other fitting 40 rather than with the adjacent fitting 40 so as to provide two separate pressure systems.

In order to admit pressure to the areas behind the pistons 20 and 25 simultaneously so as to move the gripping members 16 and 17 towards each other simultaneously, a valve V is provided which may be any standard four-way valve, which as illustrated schematically in Figure 4 of the drawings has a pair of angular passages 50 and 51 in a rotatable valve member 52 so that when the rotor 52 is in the position shown for the top clamping device B of Figure 4, pressure from the passage 31b is admitted through the curved or angular passage 50 to the longitudinal passage 30, whereby pressure is admitted to the openings 33 and 34 and behind the pistons 20 and 25, respectively. Also, when the valve V is in the position shown for the top clamping device B of Figure 4, the other angular passage 51 of the rotatable member 52 establishes fluid communication between the exhaust passage 31a and the longitudinal passage 32, whereby fluid can exhaust from in front of the pistons 20 and 25 and through the openings 35 and 36, respectively.

A special valve handle having V-shaped portions 53 and 54 (Figures 4 and 7) is connected to a shaft 52a extending from the rotatable valve member 52, whereby manipulation of the handle effects a rotation or turning of the valve member 52, as will be explained in detail hereinafter. When the valve V is shifted to the position shown for the intermediate clamping device B of Figure 4, the pressure passage 31b is connected through the valve passage 50 to the longitudinal passage 32 which therefore applies a fluid pressure to the areas in front of the pistons 20 and 25 through the lateral passages 35 and 36, respectively. At the same time, the exhaust portion 31a of the passage 31 is connected to the longitudinal passage 30 through the valve passage 51 so that the areas behind the pistons 20 and 25 are open to exhaust through the lateral passages 33 and 34, respectively. Thus, depending upon the particular position of the valve V, as determined by the particular position of the valve handle having the V-shaped portions 53 and 54 thereof, the pistons 20 and 25 are either moved towards or away from each other and consequently the gripping or clamping members 16 and 17 are either moved towards or away from each other. When the members 16 and 17 are moved towards each other with a hose H or similar elongate member therebetween for frictionally gripping same, the extent of the frictional gripping force is determined by the fluid pressure admitted through the pressure system which ultimately applies the fluid pressure behind the pistons 20 and 25.

The clamping devices B are connected together in pairs by end connecting plates 60 and 61. The plate 60 serves to close the end of the piston chamber 11a for each end section 11 with which it is connected. Likewise, the plate 61 closes the piston chamber 12a for each of the two end sections 12 with which it is connected. As best seen in Figure 4, each plate 60 and 61 extends from one of the clamping devices B to another of the clamping devices B adjacent thereto, and bolts or screws 62 (Figure 3) extend from the plates 60 and 61 into the end sections 11 and 12, respectively, so that the pair of adjacent clamping devices B are connected as a unit. Each of the clamping devices B has spindles 65 bolted to the plates 60 and 61 at each end thereof by means of the threaded shank 65a and the nut 66 thereon which holds the spindles 65 against movement relative to the plates 60 and 61.

Each of the spindles 65 has a pivotal connecting member 66 disposed thereon, each of the members 66 having a pair of spaced sleeves 66a therewith which fit over spindles 65 on adjacent devices B so as to connect together all of the pairs of devices B which are rigidly joined by the plates 60 and 61. Thus, the connecting members 66 form links between the pairs of the clamping devices B which are joined by the plates 60 and 61. Because of the pivotal movement of the member 66 about the spindle 65 of the adjacent devices B, a pivoting of the adjacent pairs of the devices B relative to each other is possible and therefore the devices B can be connected in an endless chain of such devices B as illustrated in Figure 1. On the external surface of the sleeve portions 66a (Figure 3) of the connecting link members 66, wear sleeves 67 are provided, and preferably lubrication grooves 67a and 65b are also provided for facilitating the relative movement between sleeve 66a and the spindle 65 and between the sleeve 67 and the sleeve 66a. Each of the connecting link members 66 and the sleeves 67 therewith are prevented from moving off of their respective spindles 65 by a retaining plate 68 which is connected to the spindles 65 of each of the pairs of devices B which are rigidly connected together by the connecting plates 60 and 61. Such plates 68 are maintained on the spindles 65 with which they are associated by nuts 69 on the threaded shanks 65c of the spindles 65. It will be noted from the drawings, and from Figure 4 in particular, that the spindles 65 and the sleeves 66a and 67 thereon, are equally spaced from each other, so as to accommodate the teeth of a sprocket therebetween, as will be more evident hereinafter. It will also be noted that the axes of the spindles 65 of each device B are aligned with the axes of the pistons 21 and 25, and clamping members 16 and 17 thereof so that there is no tendency for the members 16 and 17 to tilt when supporting the hose H. Also, the axes of the spindles, pistons and gripping members of each device B are perpendicular to the hose H when supporting same (Figure 2).

Thus, with the foregoing construction, the clamping devices B are connected together in the endless chain A shown in Figures 1 and 2, and a portion of which is illustrated in Figure 4. Such endless chain A may be driven or operated by numerous types of equipment, but as illustrated in Figures 1 and 2 in particular, an apparatus is shown therein for handling the hose H or similar member in a straight path while supporting the weight thereof so as to prevent destructive bending of the hose H or similar member.

Such apparatus of Figures 1 and 2 includes a base or skid S of any suitable construction for supporting the apparatus of this invention. Preferably, the base or skid S is a conventional skid which is adapted to be moved by sliding same over the ground to its location as shown in Figure 1 for use in the handling of the hose H to move same into or out of the well bore W. A frame F is mounted on the base or skid S for supporting the endless chain A and the apparatus therewith for imparting movement to the chain. Such frame F includes spaced lower sprocket support sections 70 and 71 which have mounted therewith bearing assemblies 72 and 73, respectively. A pair of spaced lower sprockets 74 and 75 have stub shafts 74a and 75a, respectively, in the bearings 72 and 73, respectively. Gears or drive sprockets 76 and 77 are also mounted on the stub shafts 74a and 75a, respectively, and are driven through chains 78, sprockets 79 and chains 80 (Figure 1) which are in turn suitably connected to any conventional driving source such as a gasoline or diesel engine which would ordinarily be mounted on the skid S also (not shown). The drive sprockets 77 impart similar rotation to the lower chain sprockets 74 and 75 which have teeth thereon fitting between the sleeves 67 at each end of each of the clamping devices B as they pass over such sprockets 74 and 75, whereby the endless chain A is driven by the power source, such as the gasoline or diesel engine. It will also be observed that the inner ends of the stub shafts 74a and 75a are spaced from each other so as to leave a central unobstructed area for a purpose to be hereinafter explained.

The frame F also includes upwardly extending upper sprocket support sections 82 and 83 which are braced and supported on the base or skid S by brackets 84 and the various support members 85 which are joined together to make a frame section rearwardly of the sections 82 and 83 (Figure 1). Such frame members 85 could, of course, be arranged in various manners and with various types of structural members so long as they are sufficient to support the sections 82 and 83.

At the upper ends of the frame members 82 and 83, upper sprocket-bearing assemblies 87 and 88 are mounted and are interconnected with a cross-brace section 91 at the upper end of the members 82 and 83 which spans the members 82 and 83 and interconnects same. The bearing assemblies 87 and 88 support the stub shafts 89a and 90a of the upper sprockets 89 and 90, respectively. The inner ends of the stub shafts 89a and 90a are spaced from each other in the same manner as the inner ends of the stub shafts 74a and 75a, for a purpose to be hereinafter explained. The sprockets 89 and 90 have teeth thereon which fit between the sleeves 67 of the clamping devices B as they pass over the upper ends of the sprockets 89 and 90 (Figures 1 and 2). The upper sprockets 89 and 90 are not driven, but merely serve as idler sprockets over which the endless chain A passes when driven by the rotation of the lower sprockets 74 and 75.

In Figures 1 and 2, one type of apparatus is shown for continuously supplying pressure and for continuously providing an exhaust from all of the clamping devices B of the endless chain A. The pressure and exhaust systems connecting all of the devices B are shown in dash lines in Figure 1, but it will be appreciated that the type of connections shown in Figures 4 and 5 are actually utilized, as explained above. In order to connect such continuous system to a source of pressure as the endless chain A rotates, a lead-in or manifold hose 92 is provided which is connected with one of the fittings 40 in a known manner. The other end of the hose 92 is coiled around a reel 93 and the inner end of such hose 92 communicates with the bore of the shaft 94 on which the reel 93 is mounted. The shaft 94 is hollow and is connected at its outer end with a swivel 95 through which air or hydraulic fluid is admitted from a source (not shown). It will be appreciated that the swivel 95 may be of any conventional construction so long as the shaft 94 and the reel 93 are adapted to rotate while the swivel 95 admits the air into the bore or inner passage of the shaft 94 to the opening connected with the hose 92, whereby continuous flow of the pressure fluid to the hose 92 is provided.

A similar arrangement is utilized for the exhaust system connecting the clamping devices B in that a lead-in or manifold hose 96 extends from a reel 97 about which it is coiled to one of the fittings 39 having fitting inlet 39a therewith (Figures 1 and 5). The shaft 98 upon which the reel 97 is mounted is hollow and has communication with the end of the hose 96 in the same manner as described above in connection with the hose 92, but it will be evident that the shaft 98 and the shaft 94 are not in fluid communication. However, the shafts 94 and 98 may be connected together for rotation as a unit. A swivel valve 99 corresponding to the swivel valve 95 is provided at the outer end of the hollow shaft 98 and is connected to any discharge pipe for permitting the exhaust of the fluid from the various gripping devices B during their actuation.

Although the reels 93 and 97 may be constructed in various manners, as shown in the drawings, particularly Figure 2, the reels 93 and 97 are constructed with a spring tension member 100 which is engaged with the reel 93 and with a free-wheeling sprocket or pulley 102. Thus, the coil spring 100 extends from the reel 93 to the sprocket 102. The sprocket or other rotatable member 102 is not mounted for rotation with the shaft 94 as is the reel 93, but instead it is rotatable relative to the shaft 94. In the drawings, the rotatable member is actually shown as a sprocket and has connection with a drive sprocket 103 through chains 104 and 105 which are interconnected with idler sprockets 106 and 107, or any other suitable mechanism for transmitting the motion of the upper sprocket 90 to the sprocket 102. In other words, the sprocket 103 is connected to the shaft 90a on which the sprocket 90 is mounted so that as the sprocket 90 rotates, the sprocket 103 is also rotated. Such rotation is imparted through the chain drive to the sprocket 102 so that it will have corresponding rotation. Since the reel 93 is connected to the hose 92 and makes a complete revolution for each revolution of the chain A, the hose 92 would tend to tighten the tension spring 100, except for the construction shown. In other words, if the spring 100 were connected to the reel 93 and to some fixed member, the spring 100 would tend to tighten on each revolution of the chain A due to the fact that the hose 92 would be continuously moving with the chain A. However, with the construction shown, the gear or rotatable member 102 is geared to the sprocket 103 so that it moves one revolution for each complete revolution of the endless chain A so that there is a continuous and constant force on the spring 100. Such force on the spring 100 is also applied in the same manner to the reel 97 in the form illustrated in the drawing since the shafts 94 and 98 are interconnected. By reason of such tension imparted to the reels 93 and 97 by the spring 100, the reels 93 and 97 tend to constantly maintain the manifold or lead-in hoses 92 and 96 in a taut condition despite the fact that the hoses 92 and 96 are constantly paying out and reeling in as the endless chain moves through its elliptical path. It should also be noted that the reason for the spacing of the inner ends of the stub shafts 74a and 75a from each other and the spacing of the inner ends of the stub shafts 89a and 90a from each other is to provide the space through which the ends of the lead-in hoses 92 and 96 can pass during their movement with the endless chain A.

As previously pointed out, the hose H is moved through a substantially straight path while the weight thereof is supported by the apparatus so that only those clamping or gripping devices B which are disposed in that straight portion of its endless path are closed for gripping the hose. Prior to the time that the gripping devices B enter the straight portion of the path for gripping the hose H, they are necessarily open to receive the hose H and subsequent to the time that they are in such straight path, they must be opened so as to release the hose H therefrom. To accomplish such opening and closing of the gripping devices B so as to move the hose H in a straight path, means are provided for automatically actuating the valves V as the clamping devices B move into such straight path and move away from such straight path.

Such actuating means includes a support bar or strip 110 which is preferably mounted at the junction between the shafts 94 and 98 and between the reels 93 and 96, with the shafts 94 and 98 being rotatable relative thereto. Such shaft 110 has lower actuating fingers 111 and 112 and upper actuating fingers 114 and 115. The details of the valve-actuating finger or pin 112 are shown in Figure 6 wherein the pin 112 is illustrated as being pivotally mounted on pivot pin 120 which extends through a U-shaped block 121. The block 121 is secured to a bracket 122 which in turn is secured to the bar 110. A resilient means such as a leaf spring 123 is connected to the bracket 122 and engages the upper surface of the finger or pin 112 to hold same in its lower extended position as shown in Figure 6. The pin 112 is, of course, limited in its downward pivotal movement by the contact with the bottom or lower surface 121a of the block 121. However, the pin 112 is free to pivot upwardly away from such surface 121a against the action of the leaf spring 123. The pin 111 is mounted in the same manner as the pin 112 except that it is adapted to pivot downwardly against a spring and is prevented from pivoting upwardly. The upper actuating pins 114 and 115 are likewise pivotable, with the pin 115 being pivotable upwardly as the pin 112 and the pin 114 being pivotable downwardly as the pin 111.

As the endless chain A is moved in a counterclockwise direction so as to lower a hose H or similar member, the gripping members B are open as they pass over the upper sprockets 89 and 90 so as to position the hose H between the gripping members 16 and 17 of each device B as it passes downwardly over the sprockets 89 and 90. Thus, as each valve V of each gripping device B passes over the upper sprockets 89 and 90 in its downward movement, the V-shaped portion 54 of the valve handle is contacted by the pin 115 which moves same from the position shown in the intermediate device B of Figure 4 to the position shown in the top device of Figure 4. Thereafter, each of the valve handle portions 54 contacts the pin 114 but since it is pivotable downwardly it simply moves out of the way and has no effect on the valve V. It will be appreciated that when the valve V is in the position shown for the top device B of Figure 4, the pressure is applied to the pistons 20 and 25 so that the gripping members 16 and 17 of that particular device B move toward each other and grip the hose H. Thus, at the point of the pin 115 each of the gripping members B is actuated to a gripping or closed position about the hose H as the endless chain moves in its counterclockwise direction for the lowering of the hose H or similar member. As the gripping members progress downwardly through the straight path at the forward portion of the endless chain, each of the gripping devices B has its valve handle portion 53 engaged by the actuating pin 112, as illustrated in Figure 7. Such finger 112 cannot pivot downwardly, so it forces the handle 53 from its position shown in Figure 7 upwardly to cause the gripping members 16 and 17 to retract from their gripping engagement with the hose H. In Figure 4, the pin 112 is illustrated in section just prior to the time that it contacts the handle portion 53 of the upper one of the clamping devices B in Figure 4. Thus, the finger 112 ultimately slides into the space between the fork of the handle portion 53 as shown in Figure 7 because the endless chain A is moving downwardly relative to such finger 112. As the chain continues to move downwardly relative thereto, the finger 112 contacts the upper portion or leg of the forked member 53 so as to rotate the handle of the valve upwardly. As the handle reaches its position shown in the intermediate device B of Figure 4, the finger 112 then is in a position to be released from the fork of the handle portion 53 because the handle 53 has turned sufficiently to allow it to continue in movement relative to the pin 112 without further engagement therewith. In other words, the handle portion 53 would be in the position shown for the intermediate gripping device B of Figure 4 after the pin 112 has actuated same for the opening of the gripping members 16 and 17.

When the movement of the chain A is reversed so that it moves in a clockwise direction for the raising of a hose H or a similar member, the pins 111 and 114 are utilized rather than the pins 115 and 112. Thus, during such clockwise movement of the endless chain A, the gripping devices B will each be independently actuated to move same from their open nongripping position to their gripping position about the hose H when the valve handle portion 53 of each of the valves V is engaged by the pin 111. The pin 112 is, of course, simply moved out of the way or pivoted by the valves as they contact same during the upward movement of the devices B. The devices B therefore remain closed in gripping engagement with the hose H until they reach substantially the upper end of the travel through the straight path portion of the endless chain path, at which time the pin 114 engages the valve handle portion 54 of each of the valves V passing such pin 114 so as to effect an opening of the gripping members 16 and 17 of each of the devices B at that point whereby the gripping engagement with the hose H is released.

In order to stabilize the rod or bar 110 which supports the fingers 111, 112, 114 and 115, each of the devices B has a guide bracket 125 positioned below the valve V (Figures 3, 4 and 7). Each of such brackets 125 has a notch 125a formed therein for receiving the edge of the bar or strip 110. Thus, as the devices B are passing through the straight portion of the path which is on the forward side of the apparatus (to the left in Figure 1), the guide brackets 125 are all in engagement with the bar or strip 110 so as to prevent any shifting thereof. It will thus be appreciated that the guide brackets 125 function to maintain the support bar or strip 110 in proper alignment so that the pins 111, 112, 114 and 115 thereon properly actuate the valves V, while at the same time avoiding any stabilizing structure which would interfere with the movement of the hoses 92 and 96 during their revolutions with the endless chain A.

The operation or use of the apparatus of this invention is believed evident from the foregoing description. Assuming the hose H is being lowered into the well bore W or other similar location, the endless chain A of the clamping devices B are moving in a counterclockwise direction (as viewed in Figure 1) and only those gripping devices B which are in the straight portion of the path at the forward or outboard side of the apparatus (the left side in Figure 1) are closed or in gripping contact with the hose H. The remainder of the gripping devices B in the endless chain A are open or retracted. As each of the gripping devices B passes over the upper sprockets 89 and 90, the valve V thereof has its valve handle portion 54 moved by the actuating finger 115 to close the gripping members 16 and 17 thereof. Such gripping of the hose H by the gripping members 16 and 17 of the particular gripping device B, which has been actuated at that point by the finger 115, are moved inwardly as a result of the pressure supplied to the areas behind the pistons 20 and 25, the valve B having been moved from the position shown for the intermediate gripping device in Figure 4 to the position shown for the top gripping device in Figure 4. Thus, as each of the gripping devices B has its valve actuated by the finger 115, the gripping members 16 and 17 thereof move toward each other and confine the hose H therebetween with a gripping force. All of the gripping devices B which pass below the finger 115 remain in the gripping or closed position so that all of the gripping devices B at the outboard side of the endless chain A are closed until such devices contact the lower actuating finger 112. Such finger 112 contacts the handle portion 53 of the valves V consecutively as the gripping devices move consecutively downwardly. The finger 112 carries the valve handle from the position shown at the top gripping device B of Figure 4 to the position shown for the intermediate gripping device B of Figure 4. Thus, as each gripping device B passes downwardly around the lower sprockets 74 and 75, they are opened or retracted so that they do not interfere with the straight downward lowering of the hose H or similar member into the well bore W. During such movement of the endless chain A, the fingers 114 and 111 are simply pivoted against the spring or resilient member therewith, but they have no effect upon the valves during the counterclockwise movement of the endless chain A. The springs or resilient members which are associated with the fingers 111 and 114 and which correspond with the resilient leaf spring 123 (shown in Figure 6) for the finger 112, return the fingers 114 and 111 to the normal position substantially perpendicular to the bar or strip 110 supporting same.

Assuming the endless chain A is utilized for hoisting or lifting the hose H out of the well bore W for subsequent winding upon a drum or the like (not shown), the gripping devices B are closed only when they are passing through the straight portion of the endless path which is outboard or to the left in Figure 1. Thus, as the open gripping devices B pass downwardly and up from the lower side of the sprockets 74 and 75, the finger 111 engages the fork-handle portion 53 of the valve member V to move same from the position shown for the intermediate gripping device B of Figure 4 to the position shown for the top gripping device of Figure 4, whereby pressure is admitted to the areas behind the pistons 20 and 25 of that particular gripping device B to cause the gripping members 16 and 17 thereof to move inwardly and engage the hose H or similar member therebetween with a gripping force to hold same. Each successive gripping device B that moves upwardly from the bottom side of the sprockets 74 and 75 is thus actuated by the finger 111 to close same about the external surface of the hose H. All of the gripping devices B then remain closed or in gripping contact with the hose H until the forked handle portion 54 of each successive valve of each successive gripping device B is engaged by the finger 114 to shift the valve V back from the gripping position shown for the top gripping device B of Figure 4 to the released position shown by the intermediate gripping device B of Figure 4. During such upward travel of the gripping devices B at the forward or outboard side of the apparatus while the endless chain is moving in its clockwise direction, the fingers 112 and 115 do not effect the operation of the valves V, but instead they are pivoted against the springs such as 123 as the valves pass, and are thereafter returned to their extended or perpendicular position by the force of such springs.

Regardless of the direction of movement of the endless chain A, the hoses 92 and 96 which are serving to lead in the pressure and the exhaust 4 all of the gripping devices B, move with the endless chain A, since each of the hoses 92 and 96 is connected to one of the devices B in the chain A. The spring 100 maintains a tension on the reels 93 and 97 so that no slack occurs in the hoses 92 and 96 as they move with the endless chain A, and the compensating mechanism for the spring 100 which includes the sprocket 102 and the sprocket 103 and the chain drive therebetween operates in either direction to prevent any winding up of the coil spring 100. Therefore, a constant tension is applied to the reels 93 and 97 by the spring 100 regardless of the direction the chain A moves.

It should be pointed out that by the use of the hydraulic or fluid pressure system in this apparatus, the pressure applied by the gripping members 16 and 17 may be varied without any manipulation or work on the apparatus, because the fluid pressure of the system is regulated at the source of the fluid pressure. Thus, without interrupting the operation of the apparatus, the gripping force on the hose H can be increased or decreased. For example, during the lowering of a hose in a well bore, the gripping force of the members 16 and 17 can be gradually increased as the length and therefore the weight of the hose H increases. Also, if the hose H or similar elongate member such as a pipe becomes stuck in the well bore, the gripping force of the members 16 and 17 can be increased during the pulling of the stuck member.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for handling an elongate member, comprising a plurality of clamping devices, link means connecting said clamping devices together to form an endless chain, upper and lower sprockets in operable engagement with said link means for driving said clamping devices, means disposed to one side of said clamping devices for driving one of said sprockets, a hose system disposed in the area bounded by said endless chain for supplying pressure fluid to said clamping devices, said hose system including a flexible hose movable in said area bounded by said endless chain in an endless path corresponding to the movement of said endless chain, a valve mounted with each of said clamping devices, and valve operating means disposed in said area bounded by said endless chain for coaction with said valves to open and close said clamping devices in synchronization with the movement of said endless chain in either direction.

2. An apparatus for handling an elongate member, comprising a plurality of clamping devices each of which has fluid pressure actuated gripping members to grip and release said elongate member, means connecting said clamping devices together to form an endless chain with the gripping members opening on the exterior side of said endless chain to receive the elongate member, and fluid pressure means operatively connected with each of said clamping devices and disposed in the area bounded by said endless chain of clamping devices for selectively operating the gripping members of said clamping devices with pressure fluid to grip and release said elongate member, said fluid pressure means including, a valve means on each of said clamping devices for controlling the inlet and exhaust of fluid pressure to each clamping device, and means for actuating each of said valve means at a predetermined point in the path of travel of said endless chain.

3. An apparatus for handling an elongate member, comprising a frame having a pair of laterally spaced supports, a plurality of clamping devices each of which has fluid pressure actuated gripping members to grip and release said elongate member, means connecting said clamping devices together to form an endless chain which is adapted to move in an endless path between said spaced supports and with the gripping members opening on the exterior side of said endless chain to receive the elongate member, a drive means for driving said endless chain, an endless conductor connected to each clamping device for providing pressure fluid thereto, a valve means on each of said clamping devices for controlling the flow of pressure fluid to each clamping device, actuating means for actuating each of said valve means at a predetermined point in the path of travel of said endless chain for admitting pressure fluid to each clamping device successively, and a fluid pressure supply means having a fluid pressure conductor operatively connected with said endless conductor and disposed in the area bounded by said endless chain of clamping devices, and a fluid inlet also disposed in the area bounded by said endless chain for establishing fluid communication from a source of fluid pressure externally of the frame to said fluid conductor, whereby the gripping members of said clamping devices are supplied with pressure fluid to grip and release said elongate member in accordance with the actuation of said actuating means.

4. The structure set forth in claim 3, including a second endless conductor connected to each clamping device for exhausting pressure fluid therefrom, and additional actuating means for actuating each of said valve means at another predetermined point in the path of travel of said endless chain for exhausting pressure fluid from each clamping device successively.

5. In an apparatus for handling an elongate member, a plurality of pressure fluid actuated clamping devices, link means connecting said clamping devices together to form an endless chain, upper and lower sets of sprockets in operable engagement with said link means for driving said clamping devices upon the driving of one set of said sprockets, an endless hose system interconnecting said clamping devices to handle pressure fluid for the opening and closing of said clamping devices, a supply hose connected to said hose system, and a reel means disposed in the area bounded by said endless chain for supporting said supply hose for movement in an endless path with said endless hose system.

6. In an apparatus for handling an elongate member, a plurality of pressure fluid actuated clamping devices, link means connecting said clamping devices together to form an endless chain, upper and lower sets of sprockets in operable engagement with said link means for driving said clamping devices upon the driving of one set of said sprockets, an endless hose system interconnecting said clamping devices to handle pressure fluid for the opening and closing of said clamping devices, a supply hose connected to said hose system, a reel means supporting said supply hose for movement with said endless hose system, and means for applying a predetermined force to said reel means for maintaining said supply hose taut at all times as said supply hose moves in an endless path with said endless hose system.

7. In an apparatus for handling an elongate member, a plurality of pressure fluid actuated clamping devices, link means connecting said clamping devices together to form an endless chain, upper and lower sets of sprockets in operable engagement with said link means for driving said clamping devices upon the driving of one set of said sprockets, an endless hose system interconnecting said clamping devices to handle pressure fluid for the opening and closing of said clamping devices, a supply hose connected to said hose system, a reel means supporting said supply hose for movement with said endless hose system and means for applying a predetermined force to said reel means for maintaining said supply hose taut at all times during the movement of said supply hose in an endless path with said endless hose system, said means for applying a predetermined force including a resilient means for applying a torque force to said reel means to apply a force on said reel means which tends to wind up said supply hose on said reel means, and means to maintain the force exerted by said resilient means substantially constant as said endless chain of clamping devices moves in an endless path.

8. The structure set forth in claim 7, wherein said means for applying a predetermined force includes a compensating drive connection from one set of said sprockets to said reel means for controlling the timing and direction of rotation of said reel means in synchronization with the endless movement of said endless chain.

9. In an apparatus for handling an elongate member, a plurality of pressure fluid actuated clamping devices, link means connecting said clamping devices together to form an endless chain, upper and lower sets of sprockets in operable engagement with said link means for driving said clamping devices upon the driving of one set of said sprockets, a shaft located substantially centrally within said endless chain and having a longitudinally extending opening therein, means for introducing fluid pressure to the opening in said shaft, fluid conductor means establishing fluid communication from said opening in said shaft and to said clamping devices for supplying the fluid pressure from said shaft to each of said clamping devices, reel means on said shaft for winding one end of said conductor means thereon while maintaining said fluid communication from said shaft to said fluid conductor means, and means for timing the rotation and controlling the direction of rotation of said shaft in synchronization with the rotation of said endless chain.

10. The structure set forth in claim 9, wherein said fluid conductor means includes an endless hose system and a supply hose connected therewith, and wherein said means for timing and controlling the shaft rotation includes a sprocket means mounted on said shaft, a torsion spring interconnecting said sprocket means on said shaft with said reel means to apply a predetermined torsion force to said reel means which tends to keep said supply hose taut, and a drive connection from said sprocket means on said shaft to one set of said sprockets for rotating said sprocket means in a predetermined ratio with respect to the amount that said sets of sprockets are rotated to vary the position of said spring to thereby maintain the application of a substantially constant torsion force to said reel means by said torsion spring.

11. An apparatus for handling an elongate member, comprising a plurality of pressure fluid actuated clamping devices, link means connecting said clamping devices together to form an endless chain, upper and lower sprockets in operable engagement with said link means for driving said clamping devices, a hose system disposed in the area bounded by said endless chain for supplying pressure fluid to said clamping devices, said hose system including a flexible hose movable in said area bounded by said endless chain in an endless path corresponding to the movement of said endless chain, a valve mounted with each of said clamping devices, and valve operating means disposed in the area bounded by said endless chain for coaction with said valves to open and close said clamping devices in synchronization with the movement of said endless chain in either direction.

12. An apparatus for handling an elongate member, comprising a plurality of pressure fluid actuated clamping devices, link means connecting said clamping devices together to form an endless chain, upper and lower sprockets in operable engagement with said link means for driving said clamping devices, means disposed to one side of said clamping devices for driving one of said sprockets, hose system disposed in an endless path for said endless chain for supplying pressure fluid to said clamping devices, a flexible hose movable in the area bounded by said endless chain in an endless path corresponding to the movement of said endless chain, a valve mounted with each of said clamping devices, stationary valve operating means disposed inwardly of said endless chain, and control means on each valve adapted to contact said valve operating means to successively close the clamping devices passing through a substantially straight portion of the path followed by the endless chain for thereby gripping and feeding such elongate member.

13. The structure set forth in claim 12, including additional stationary valve operating means disposed in said area bounded by said endless chain for engagement by each control means of each valve to open the clamping device therewith for releasing same from the elongate member.

14. An apparatus for handling an elongate member, comprising a plurality of pressure fluid actuated clamping devices, link means connecting said clamping devices together to form an endless chain, upper and lower sprockets in operable engagement with said link means for driving said clamping devices, a source of pressure fluid positioned externally of said endless chain, a first endless fluid conductor disposed in an endless path with said endless chain for supplying pressure fluid to said clamping devices, valve means with each clamping device for controlling the admission of the pressure fluid from the fluid conductor system to each clamping device at a predetermined point for gripping the elongate member and at another predetermined point for releasing each clamping device from gripping contact with the elongate member, a fluid inlet tube extending laterally into the area bounded by said endless chain and having connection with said source of pressure fluid, a second fluid conductor having one end thereof connected to said first endless fluid conductor and the other end connected to said fluid inlet tube within the area bounded by said endless chain, said second fluid conductor being movable in said area bounded by said endless chain with said one end thereof being movable for one or more revolutions thereof with the endless chain, and means for maintaining the supply of pressure fluid from said fluid inlet tube to said other end of said second fluid conductor as said endless chain revolves for thereby maintaining the pressure fluid supply to the clamping devices during their movement in the endless path.

15. The structure set forth in claim 14, wherein said fluid inlet tube includes a shaft having a longitudinal opening therein and extending laterally through substantially the mid-portion of said area bounded by said endless chain, and wherein the connection between the fluid inlet tube and the pressure fluid source includes a swivel connection means having a fluid passage therethrough in fluid communication with said longitudinal opening of said shaft for supplying pressure fluid to said opening from the pressure fluid source located externally of said endless chain as said shaft rotates in response to the movement of the fluid conductor with the endless chain.

16. An apparatus for handling an elongate member, comprising a plurality of clamping devices, link means connecting said clamping devices together to form an endless chain, upper and lower sprockets in operable engagement with said link means for driving said clamping devices, a hose system disposed in an endless path with said endless chain for supplying pressure fluid to said clamping devices, a flexible hose movable in the area bounded by said endless chain in an endless path corresponding to the movement of said endless chain, a valve mounted with each of said clamping devices, stationary valve operating means disposed inwardly of said endless chain, and control means on each valve adapted to contact said valve operating means to successively close the clamping devices passing through a substantially straight portion of the path followed by the endless chain for thereby gripping and feeding such elongate member.

17. An apparatus for handling an elongate member, comprising a plurality of clamping devices, link means connecting said clamping devices together to form an endless chain, upper and lower sprockets in operable engagement with said link means for driving said clamping devices, a hose system disposed in an endless path with said endless chain for supplying pressure fluid to said clamping devices, a flexible hose movable in the area bounded by said endless chain in an endless path corresponding to the movement of said endless chain, a valve mounted with each of said clamping devices, stationary valve operating means disposed inwardly of said endless chain, and control means on each valve adapted to contact said valve operating means to successively close the clamping devices passing through a substantially straight portion of the path followed by the endless chain for thereby gripping and feeding such elongate member, and additional stationary valve operating means disposed inwardly of said endless chain for engagement by each control means of each valve to open the clamping device therewith for releasing same from the elongate member.

18. An apparatus for handling an elongate member comprising, a frame having a pair of longitudinally extending frame supports with a lateral space therebetween, a first pair of stub shafts mounted on said frame supports and extending into the lateral space between said supports, the inner ends of said first stub shafts being laterally spaced from each other, a first pair of sprockets on the first pair of stub shafts, a second pair of stub shafts mounted on said frame supports at a longitudinal distance from the first pair of stub shafts and extending into the lateral space between said supports, the inner ends of said second stub shafts being laterally spaced from each other, a second pair of sprockets on the second pair of stub shafts, a plurality of fluid pressure actuated gripping members connected together in an endless chain and mounted on said first and second pairs of sprockets for movement in an endless path extending into the lateral space between said frame supports, a source of pressure fluid mounted separately of the endless chain, a fluid conductor system connected from said source of pressure fluid to all of said gripping members, said fluid conductor system including an endless conductor, and said system also including fluid conductor means connected from said source of pressure fluid to said endless conductor and adapted to move in an endless path with said endless chain and disposed in the area bounded by said endless chain, a portion of said fluid conductor system being adapted for movement between the inner ends of said first and second pairs of stub shafts during such movement in the endless path.

19. In an apparatus for handling an elongate member, a plurality of pressure fluid actuated clamping devices open to the exterior, link means connecting each side of all of said clamping devices together to form an endless chain on each side of said clamping devices, a pair of upper sprockets and a pair of lower sprockets over which said link means are disposed for driving said clamping devices upon the driving of one of said sprockets, each of said clamping devices including a pair of gripping jaws which are open to the area outside of the area bounded by said link means for receiving said elongate member laterally between the jaws, fluid actuated means for moving said gripping jaws towards and away from each other, and valve means for controlling the fluid actuated means extending into the area bounded by said link means, means positioned in the area bounded by said link means and operable independently of said sprockets to actuate the valve of each of said clamping devices as each clamping device leaves one pair of said sprockets to cause same to grip said elongate member, and additional means also positioned in the area bounded by said link means and operable independently of said sprockets to actuate the valve of each of said clamping devices as each clamping device approaches the other pair of said sprockets to disengage same from its gripping engagement with said elongate member.

20. An apparatus for handling an elongate member, comprising a plurality of clamping devices each of which has fluid pressure actuated gripping members to grip and release said elongate member, means connecting said clamping devices together to form an endless chain with the gripping members opening on the exterior side of said endless chain to receive the elongate member, and fluid pressure means operatively connected with each of said clamping devices for selectively operating the gripping members of said clamping devices with pressure fluid to grip and release said elongate member, said fluid pressure means including, a first endless conductor for supplying the pressure fluid to open or close the gripping members to a gripping position or a non-gripping position, a second endless conductor for exhausting pressure fluid from the gripping members during the opening or closing of the gripping members, a fluid inlet means positioned in the area bounded by said endless chain and extending laterally therefrom, a first fluid conductor connecting the fluid inlet means to said first endless conductor for providing pressure fluid to the gripping members as they move in their endless path, said first fluid conductor being positioned in the area bounded by said endless chain for movement in an endless path in said area with the endless chain, a fluid discharge means positioned in the area bounded by said endless chain and extending laterally therefrom, a second fluid conductor connecting the fluid discharge means to said second endless conductor for exhausting pressure fluid from the gripping members as they move in their endless path, said second fluid conductor being positioned in the area bounded by said endless chain for movement in an endless path in said area with the endless chain, a valve means on each of said clamping devices for controlling the inlet and exhaust of fluid pressure to each clamping device, and means for actuating each of said valve means at selected points in the path of travel of said endless chain for closing and opening said gripping members to grip and release the elongate member as the elongate member is moved by said endless chain of gripping members.

References Cited in the file of this patent

UNITED STATES PATENTS

| | | |
|---|---|---|
| 1,746,221 | Matteson | Feb. 4, 1930 |
| 1,911,157 | Leech | May 23, 1933 |
| 2,057,939 | Davis | Oct. 20, 1936 |
| 2,149,641 | Temple | Mar. 7, 1939 |
| 2,339,762 | Bruestle | Jan. 25, 1944 |
| 2,521,352 | Dockerty et al. | Sept. 5, 1950 |
| 2,584,870 | Holly | Feb. 5, 1952 |
| 2,679,177 | Gepfert | May 25, 1954 |
| 2,702,929 | Laddon et al. | Mar. 1, 1955 |
| 2,732,083 | Smith | Jan. 24, 1956 |
| 2,769,529 | Soriano | Nov. 6, 1956 |